US012777168B2

(12) United States Patent
Völcker et al.

(10) Patent No.: US 12,777,168 B2
(45) **Date of Patent: *Oct. 27, 2026**

(54) EDITABLE VIDEO DATA SIGNED ON DECOMPRESSED DATA

(71) Applicant: Axis AB, Lund (SE)

(72) Inventors: Björn Völcker, Lund (SE); Stefan Lundberg, Lund (SE)

(73) Assignee: Axis AB, Lund (SE)

( * ) Notice: Subject to any disclaimer, the term of this patent is extended or adjusted under 35 U.S.C. 154(b) by 284 days.

This patent is subject to a terminal disclaimer.

(21) Appl. No.: 18/510,996

(22) Filed: Nov. 16, 2023

(65) Prior Publication Data

US 2024/0205426 A1 Jun. 20, 2024

(30) Foreign Application Priority Data

Dec. 15, 2022 (EP) .................................... 22213745

(51) Int. Cl.
*H04N 19/176* (2014.01)
*H04L 9/06* (2006.01)
(Continued)

(52) U.S. Cl.
CPC ......... *H04N 19/176* (2014.11); *H04L 9/0643* (2013.01); *H04L 9/3247* (2013.01);
(Continued)

(58) Field of Classification Search
None
See application file for complete search history.

(56) References Cited

U.S. PATENT DOCUMENTS 5,907,619 A 5/1999 Davis
7,437,007 B1 10/2008 Augustine et al.
(Continued)

FOREIGN PATENT DOCUMENTS

EP 3968636 A1 3/2022
EP 4090015 A1 11/2022
(Continued)

OTHER PUBLICATIONS

Ramaswamy, N., "Video Authentication for H.264/AVC using Digital Signature Standard and Secure Hash Algorithm", International Workshop on Network and Operating System Support for Digital Audio and Video, (2006).
(Continued)

*Primary Examiner* — Mohammed Jebari
(74) *Attorney, Agent, or Firm* — Volpe Koenig

(57) ABSTRACT

A signed video bitstream obtained by prediction coding of a video sequence includes data units and associated signature units, wherein each data unit represents one macroblock in a video frame. Each signature unit includes a digital signature of a bitstring derived from fingerprints, and each fingerprint has been computed from a macroblock reconstructed from one data unit associated with the signature unit. The bitstream is edited by: receiving a request to substitute a region; reconstructing a first set of macroblocks, in which said region is contained, and a second set of macroblocks referring to macroblocks in the first set; adding an archive object that includes fingerprints of the first set of macroblocks; editing the first set of data units and encoding them; re-encoding the second set of macroblocks; and adding the new data units to the signed video bitstream.

12 Claims, 10 Drawing Sheets

(51) Int. Cl.

| | |
|---|---|
| ***H04L 9/32*** | (2006.01) |
| ***H04N 19/40*** | (2014.01) |
| ***H04N 19/46*** | (2014.01) |
| ***H04N 21/835*** | (2011.01) |

(52) U.S. Cl.

CPC ............. *H04N 19/40* (2014.11); *H04N 19/46* (2014.11); *H04N 21/835* (2013.01)

(56) References Cited

U.S. PATENT DOCUMENTS

| | | | | |
|---|---|---|---|---|
| 11,082,710 | B2 | 8/2021 | Hoarty et al. | |
| 2005/0050332 | A1* | 3/2005 | Serret-Avila ....... | H04N 1/32208 713/176 |
| 2010/0177891 | A1* | 7/2010 | Keidar .................... | G06F 21/60 375/E7.026 |
| 2010/0317420 | A1* | 12/2010 | Hoffberg ............ | G06Q 30/0282 463/1 |
| 2011/0032984 | A1* | 2/2011 | Dorman ................. | H04N 19/14 375/240.2 |
| 2013/0163679 | A1* | 6/2013 | Zhang .................... | H04N 19/61 375/240.26 |
| 2014/0010366 | A1* | 1/2014 | Quinn ................ | H04N 21/8352 380/200 |
| 2014/0108441 | A1* | 4/2014 | Samari ................ | G06F 16/2477 707/758 |
| 2015/0295926 | A1* | 10/2015 | Husain .................. | H04L 63/145 726/6 |
| 2016/0012465 | A1* | 1/2016 | Sharp ................... | G06Q 20/321 705/14.17 |
| 2020/0267404 | A1* | 8/2020 | Levy ..................... | H04L 9/3239 |
| 2020/0382319 | A1* | 12/2020 | Ramaraju ............. | H04L 9/3239 |
| 2022/0086468 | A1 | 3/2022 | Hultqvist et al. | |
| 2024/0085566 | A1* | 3/2024 | Mobarak ............... | G01S 19/073 |

FOREIGN PATENT DOCUMENTS

| | | | |
|---|---|---|---|
| EP | 4164173 | A1 | 4/2023 |
| EP | 4164230 | A1 | 4/2023 |
| WO | 2021/059593 | A1 | 4/2021 |

OTHER PUBLICATIONS

Extended European Search Report issued on Apr. 17, 2023 for European Patent Application No. 22213744.0.

Extended European Search Report issued on Apr. 17, 2023 for European Patent Application No. 22213745.7.

Recommendation H.264 (Jun. 2019), "Advanced video coding for generic audiovisual services," H.264 (2019).

Lin C-Y et al: "Issues and Solutions for Authenticating MPEG Video" Proceedings of SPIE, IEEE, US, vol. 3657, Jan. 25, 1999.

* cited by examiner

EDITABLE VIDEO DATA SIGNED ON DECOMPRESSED DATA

TECHNICAL FIELD

The present disclosure relates to the field of security arrangements for protecting video data against unauthorized activity, especially in connection with storage and transmission of data. It proposes methods and devices for editing a signed video bitstream and for validating a signed video bitstream that may result from such editing.

BACKGROUND

Digital signatures provide a layer of validation and security to digital messages that are transmitted through a non-secure channel. By means of the digital signature, the authenticity or integrity of a message can be validated, and non-repudiation can be ensured. With regard to video coding particularly, there are safe and highly efficient methods for digitally signing a prediction-coded video sequence, which have been described in the prior art. See for example the published earlier patent applications EP4164173A1 and EP4164230A1 by the present inventors. See also US20140010366A1, which proposes a cryptographic video verification technique that is specifically adapted for prediction-coded video data with a group-of-pictures structure.

A video sequence may need to be edited after it has been signed. In addition to visual improvements, the edits could aim to ensure privacy protection by cropping, masking, blurring or similar image processing that renders visual features less recognizable. With most available methods, this will require re-encoding and re-signing the edited frames in their entirety. The re-encoding and re-signing should preferably be extended into a number of neighboring frames too, even though the neighboring frames are not directly affected by the edits, so as not to disturb any prediction-coding dependencies (inter-frame/intra-frame references) that may exist. These steps may consume significant computational resources and could lead to delays that are awkward for the user.

U.S. Pat. No. 7,437,007B1 discloses a method of performing region-of-interest editing of a video stream in the compressed domain. The compressed video stream includes a compressed video stream frame, which represents a video stream frame having an unwanted portion and a region-of-interest portion. According to the method, the compressed video stream frame is edited to modify said unwanted portion and obtain a compressed video stream frame comprising said region-of-interest portion while maintaining an original structure of said video stream. To achieve this, said editing comprises skipping macroblocks located above, below and to the right of said region-of-interest portion for predictive coded (P) frames and bi-directionally predictive-coded (B) frames. The video stream under consideration in U.S. Pat. No. 7,437,007B1 is not a signed video stream.

SUMMARY

One objective of the present disclosure is to make available a method of editing a signed video bitstream obtained by prediction coding of a video sequence that largely avoids the need to re-sign the bitstream outside the portions affected by the editing, as is the case with some available methods. A particular objective is to make available such a video editing method that preserves the signatures of all macroblocks except for the edited ones. A further objective is to enable the video editing without any significant detriment to the data security of the original signed video bitstream. A further objective is to provide a method of validating a signed video bitstream obtained by prediction coding of a video sequence. It is a still further objective to provide devices and computer programs for these purposes.

At least some of these objectives are achieved by the invention as defined by the independent claims. The dependent claims relate to advantageous embodiments of the invention.

In a first aspect of the present disclosure, there is provided a method of editing a signed video bitstream, which has been obtained by prediction coding of a video sequence. The signed video bitstream shall include data units and associated signature units. Each data unit represents (i.e., encodes) at most one macroblock in a video frame of the prediction-coded video sequence. Each signature unit includes a digital signature of a bitstring derived from a plurality of fingerprints, and each fingerprint has been computed from a macroblock reconstructed from one data unit associated with the signature unit. The signature unit may optionally include ('document approach') the bitstring to which the digital signature pertains. For a signed video bitstream with these characteristics, the method comprises: receiving a request to substitute a region of at least one video frame; reconstructing a first set of macroblocks, in which said region is contained, and a second set of macroblocks referring directly or indirectly to macroblocks in the first set; adding an archive object to the signed video bitstream, the archive object including fingerprints computed from the reconstructed first set of macroblocks; editing the first set of macroblocks in accordance with the request to substitute and encoding the edited first set of macroblocks as a first set of new data units; re-encoding the second set of macroblocks as a second set of new data units; and adding the first and second sets of new data units to the signed video bitstream.

Because the data units and macroblocks are in a one-to-one relationship, no data unit represents multiple macroblocks, (nor portions of multiple macroblocks), and thus the direct effect of editing some macroblocks is confined to the edited macroblocks' data unit or data units (first set). Since furthermore each fingerprint is computed from a macroblock reconstructed from one associated data unit, the need for re-signing data units after the editing is kept in bounds. More precisely, the method according to the first aspect preserves any prediction-coding dependencies that connect pairs or groups of macroblocks, namely, by re-encoding a set (second set) of data units representing macroblocks referring directly or indirectly to the edited macroblock(s). If the re-encoding is restricted to this second set of data units, the method will utilize available computational efforts efficiently. This allows the method to be executed with satisfactory performance on ordinary processing equipment.

The method according to the first aspect involves a further advantage on the recipient side. Thanks to the archive object, from which the fingerprints relating to the first set of data units can be retrieved, a recipient will be able to validate all data units of the signed video bitstream that have not been affected by the editing. This allows a significant part of the existing signatures to be preserved; the video editing method according to the first aspect can be said to be minimally destructive in this regard. The validation at the recipient side will be explained in detail within the second aspect of the present disclosure. Importantly, the fingerprints relating to the second set of macroblocks need not be archived, because the reencoding is an operation that should not change the visual appearance of these macroblocks.

In some embodiments, the data security of the edited signed video bitstream is improved by adding, to the bitstream, one or more signature units associated with the edited first set of macroblocks. This avoids a scenario of unauthorized modification of the edited first set of macroblocks. The one or more signature units may be new signature units added to the bitstream or edited (substitute) versions of signature units that were included in the signed video bitstream prior to the editing. The integrity of the second set of macroblocks is protected by the digital signatures already present in the signature units in the bitstream. Indeed, because the fingerprints are computed from reconstructed macroblocks and the reencoding operation should alter the visual appearance negligibly or not at all, the recipient may verify the integrity of the second set of macroblocks using the existing digital signatures.

In some embodiments, the archive object further includes positions of the first set of macroblocks. A position may refer to the macroblock's position in a frame, e.g., in frame coordinates. If a static macroblock partitioning is used, the position of a macroblock can be expressed as a macroblock sequence number or another identifier. This provides one way of aiding a recipient of the edited video bitstream to determine whether a particular macroblock has been changed, and thus to select the proper way of obtaining a fingerprint of the data unit that represents said macroblock.

In some embodiments, the second set of macroblocks are re-encoded losslessly, whereby new data units are obtained. The use of lossless coding ensures that macroblocks which are later reconstructed from these new data units will not differ from the second set of macroblocks. As a result, because fingerprints are computed from reconstructed pixel/plaintext data, the new data units remain consistent with the signature units that were already present in the video bitstream before the editing. In other embodiments, the second set of macroblocks are re-encoded using reduced data compression, and the fingerprints of the second set of macroblocks in the signed video bitstream include robust hashes. Robust hashing refers to a class of algorithms with a tolerance, such that the algorithm accepts a data set as authentic even if it has undergone minor differences. The algorithm may be optimized for hashing image or video data. The tolerance of the algorithm may be configurable; the tolerance may be set such that the normal errors to be expected from data compression are undetectable (they are minor difference in the above sense), whereas errors corresponding to tampering are detected.

In some embodiments, the second set of macroblocks are re-encoded non-predictively. Non-predictive coding may correspond to using only I-frames. This is a simple and robust way of re-encoding the second set of macroblocks. The additional memory or bitrate cost is unlikely to be critical if editing is assumed to be relatively rare. In other embodiments, the second set of macroblocks are re-encoded predictively with reference to the edited first set of macroblocks. For example, the same GoP structure can be preserved for continuity. These embodiments, however, may perform less well from the point of view of data compression, as they will include an attempt to predict across the discontinuity that the editing introduces. If the discontinuity is significant, the B or P frames may be larger than usual, or quality may drop locally.

In some embodiments, the edited first set of macroblocks are encoded losslessly and/or using reduced data compression and/or non-predictively. Each of these data measures limits or avoids a further loss of image quality, in addition to the one incurred by an original image coding operation. The added computational and/or memory cost for this encoding is likely justified, as the edited macroblocks are likely to be used or studied more attentively than the remainder of the video sequence. Further, in important use cases, including video monitoring, the size of the edited portion is usually negligible in comparison with the quantity of data produced by continuous monitoring.

In some embodiments, each time when a fingerprint is to be computed in connection with the encoding of a macroblock, the fingerprinting operation is performed on image data (e.g., plaintext data, pixel data) in a reference buffer of the encoder. This can be practiced in an encoder device that prepared the signed video bitstream. It can also be practiced in an editing tool that performs the editing method according to the first aspect. Because the reference buffer is a necessary component of most encoder implementations (i.e., to ensure correct prediction coding), the reconstructed video data to be used for fingerprinting can be obtained at no added computational cost.

In some embodiments, the second set of macroblocks are re-encoded non-predictively. In other embodiments, the second set of macroblocks are re-encoded predictively with reference to the edited first set of macroblocks.

According to a generalization of the first aspect, there is provided a video editing method performed on a signed video sequence which includes data units and associated signature units. Each macroblock in a video frame of the prediction-coded video sequence is encoded by at most M data units. An edit made to a macroblock 110 has a direct effect on at most M data units 120. Here, M is a small integer number, such as 1, 2, 3, 4, 5 or at most 10. Each signature unit includes a digital signature of a bitstring derived from a plurality of fingerprints, each fingerprint computed from a macroblock reconstructed from at most M associated data units each, and it optionally comprises the bitstring as well. The video editing method includes: receiving a request to substitute a region of at least one video frame; reconstructing a first set of macroblocks, in which said region is contained, and a second set of macroblocks referring directly or indirectly to macroblocks in the first set; adding an archive object to the signed video bitstream, the archive object including fingerprints computed from the reconstructed first set of macroblocks; editing the first set of macroblocks in accordance with the request to substitute; re-encoding the second set of macroblocks; and adding the thus obtained first and second sets of new data units to the signed video bitstream.

According to a further generalization of the first aspect, there is provided a video editing method performed on a signed video sequence which includes data units and associated signature units. Each data unit represents (encodes) at most N macroblocks in a video frame of the prediction-coded video sequence. This means that the effects of an edit made to a macroblock are not limited to the macroblock itself, but it may become necessary to re-encode and/or re-sign one or more data units that the edited macroblock shares with a further macroblock. Here, N is a small integer number, such as 1, 2, 3, 4, 5 or at most 10. Each signature unit includes a digital signature of a bitstring derived from a plurality of fingerprints relating to exactly one associated data unit each, and optionally the bitstring. The video editing method includes: receiving a request to substitute a region of at least one video frame; reconstructing a first set of macroblocks, in which said region is contained, and a second set of macroblocks referring directly or indirectly to macroblocks in the first set; adding an archive object to the signed video bitstream, the archive object including fingerprints computed from the reconstructed first set of macroblocks; editing the first set of macroblocks in accordance with the request to substitute; re-encoding the second set of macroblocks; and adding the thus obtained first and second sets of new data units to the signed video bitstream.

In a second aspect of the present disclosure, there is provided a method of validating a signed video bitstream obtained by prediction coding of a video sequence. It is understood that the signed video bitstream includes data units, signature units each associated with some of the data units, and an archive object. Each data unit represents one macroblock in a frame of the prediction-coded video sequence. Each signature unit includes a digital signature of a bitstring and optionally the bitstring itself. It is expected—and will be verified at least in part by executing the validation method—that the bitstring has been derived from a plurality of fingerprints, and further that each of the fingerprints has been computed from a macroblock reconstructed from one data unit associated with the signature unit. Finally, the archive object includes at least one archived fingerprint. The method of validating the signed video bitstream comprises: reconstructing macroblocks from data units associated with a signature unit; computing respective fingerprints from at least some of the reconstructed macroblocks; retrieving at least one archived fingerprint from the archive object; deriving a bitstring from the computed and retrieved fingerprints; and validating the data units associated with the signature unit using the digital signature in the signature unit.

The validation of the data units may include verifying the derived bitstring using the digital signature. Alternatively ('document approach'), the validation step includes verifying a bitstring in the signature unit using the digital signature, and then comparing the derived bitstring and the verified bitstring.

The archive object may have been added by performing the editing method according to the first aspect, but the method according to the second aspect can be performed without reliable knowledge of such prior processing. Accordingly, the method according to the second aspect achieves a validation of the authenticity of the video sequence in that it verifies that the digital signatures (and any bitstrings) carried in the signature units are indeed consistent with the fingerprints relating to the associated data units. Hence, the data units cannot have been modified either, as this would have implied that the corresponding reconstructed macroblocks changed.

The method according to the second aspect includes two options for obtaining the fingerprints, by direct computation from reconstructed macroblocks or retrieval from the archive object. This supports the minimally destructive handling of the existing fingerprints during the editing phase (first aspect). The fact that each data unit represents one macroblock tends to limit the number of fingerprints that need to be archived for a given substitution request, which therefore limits the size of the archive object.

In some embodiments, the archive object further indicates the positions of the macroblocks that are represented by data units to which the archived fingerprints pertain. Put differently, an archived fingerprint is a fingerprint of a macroblock reconstructed from a data unit, and the position of the macroblock is indicated in the archive object. During the execution of the method according to the second aspect, to obtain the fingerprints relating to a data unit, it is determined, based on the positions indicated by the archive object, whether to compute the fingerprint or retrieve the fingerprint from the archive object.

Like the first aspect of the present disclosure, the second aspect can be generalized to the cases reviewed above, i.e., numerical ratios of macroblocks to corresponding data units of 1:M or N:1.

A third aspect of the present disclosure relates to devices arranged to perform the method of the first aspect and/or the second aspect. These devices may be embedded in a system with a different main purpose (e.g., video recording, video content management, video playback) or they may be dedicated to said editing and validation, respectively. The devices within the third aspect of the disclosure generally share the effects and advantages of the first and second aspect, and they can be embodied with an equivalent degree of technical variation.

In a fourth aspect, a signed video bitstream includes data units and associated signature units, wherein each data unit represents at most one macroblock in a video frame of the prediction-coded video sequence, each signature unit includes a digital signature $s(H_1)$ of a bitstring $H_1$ derived from a plurality of fingerprints, and each fingerprint $h_1, h_2, \ldots$ has been computed from a macroblock reconstructed from one or more data units associated with the signature unit. In particular, the signed video bitstream includes data units and associated signature units, wherein each data unit represents exactly one macroblock in a video frame of the prediction-coded video sequence, each signature unit includes a digital signature $s(H_1)$ of a bitstring $H_1$ derived from a plurality of fingerprints, and each fingerprint $h_1, h_2, \ldots$ has been computed from a macroblock reconstructed from exactly one data unit associated with the signature unit. As explained above, if it is expected that portions of the video bitstream will be edited at a later point in time, a video bitstream with this format may bring certain advantages, including the ability to reuse the existing signature units for the purpose of validating the not-edited portions. Because the signing is applied to decoded image data, there is also no need to handle dependencies between macroblocks. A still further advantage is that the fingerprinting (e.g., hashing) can be implemented with very fine granularity, such as at the level of single pixels.

The invention further relates to a computer program containing instructions for causing a computer to carry out the above methods. The computer program may be stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

In a further aspect of the present disclosure, there is provided a signed video bitstream which includes data units and associated signature units. Each data unit represents at most N macroblocks in a video frame of the prediction-coded video sequence. Here, N is a small integer number, such as 1, 2, 3, 4, 5 or at most 10. Each signature unit includes a digital signature of a bitstring derived from a plurality of fingerprints relating to exactly one associated data unit each, and optionally the bitstring itself. The signed video bitstream is suitable for editing since the direct effect of editing one macroblock is confined to the at most N data units of the edited macroblock, and since each fingerprint is a fingerprint of exactly one associated data unit. This restricts the propagation of the editing to a limited number of data units, so that fewer data units need to be re-signed after the editing.

It should be noted that as used in this disclosure, a "macroblock" may advantageously be an encoding macroblock. However, the invention is applicable also to video that is not prediction encoded and in a more generalized case, a macroblock can therefore be any contiguous group of pixels. As the signing of the video is done on decoded frames, the grouping of pixels need not be limited to any encoding group partitioning.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order described, unless explicitly stated.

BRIEF DESCRIPTION OF THE DRAWINGS

Aspects and embodiments are now described, by way of example, with reference to the accompanying drawings, on which.

DETAILED DESCRIPTION

The aspects of the present disclosure will now be described more fully hereinafter with reference to the accompanying drawings, on which certain embodiments of the invention are shown. These aspects may, however, be embodied in many different forms and should not be construed as limiting; rather, these embodiments are provided by way of example so that this disclosure will be thorough and complete, and to fully convey the scope of all aspects of the invention to those skilled in the art. Like numbers refer to like elements throughout the description.

In the terminology of the present disclosure, a "video bitstream" includes any substantially linear data structure, which may be similar to a sequence of bit values. A video bitstream can be carried by a transitory medium (e.g., modulated electromagnetic or optical waves), as in some streaming use cases, or the video bitstream can be stored on a non-transitory medium, such as a volatile or non-volatile memory.

The video bitstream represents a video sequence, which may be understood to be a sequence of video frames to be played back sequentially with nominal time intervals. Each video frame may be partitioned into macroblocks. In the present disclosure, further, a "macroblock" can be a transform block or a prediction block, or a block with both of these uses, in a frame of the video sequence. The usage of "frame" and "macroblock" herein is intended to be consistent with an H.26x video coding standard or similar specifications. A "macroblock" can furthermore be a coding block. As noted above, although the term macroblock is used, the grouping of pixels need not be limited to any partitioning used for encoding; rather, a macroblock may be any groups of neighboring pixels. When applied in the case of prediction-based encoding, it may be advantageous to use the same partitioning as used for the encoding.

Figure 1A:
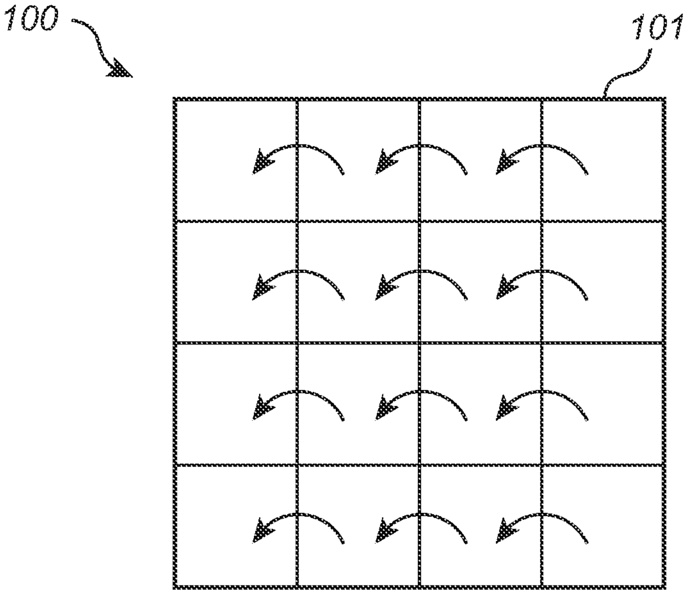
FIGS. 1A and 1B show two example patterns of intra-frame references within macroblocks in a video frame.
Figure 1B:
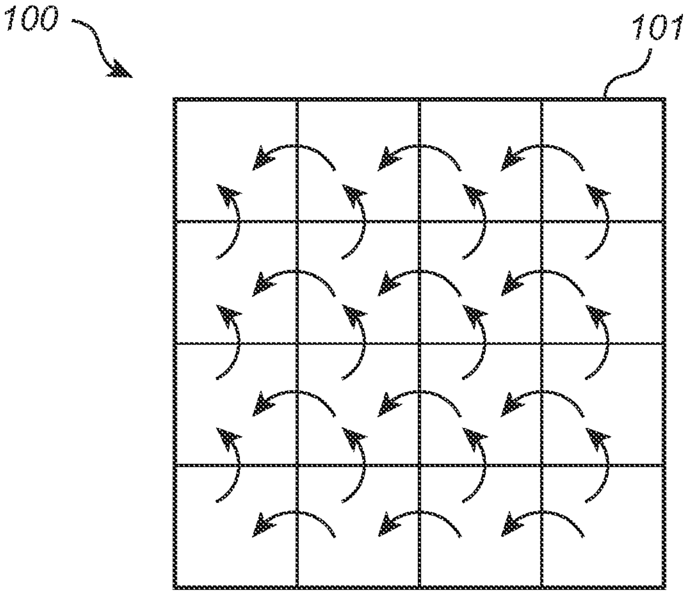

FIGS. 1A and 1B illustrate an example partition of a video frame 100 into a 4×4 uniform arrangement of macroblocks 110. It may be noted that this is a simplification for illustration purposes. In practice, a video frame 100 is generally partitioned into much larger numbers of macroblocks; for example, a macroblock could be 8×8 pixels, 16×16 pixels or 64×64 pixels. Curled arrows are consistently used herein to indicate an intra-frame or inter-frame reference to be used in prediction coding. Without departing from the scope of the present disclosure, the partition into macroblocks seen in FIGS. 1A and 1B can be varied significantly, to include non-square arrangements and/or arrangements of macroblocks 110 that are not homothetic to the video frame 100 and/or mixed arrangements of different macroblocks 110 that have different sizes or shapes. It is appreciated that some video coding formats support dynamic macroblock partitioning, i.e., the partition may be different for different video frames in a sequence. This is true, for example, of H.265.

In FIG. 1A, the pattern of intra-frame references is restricted to a single row of macroblocks 110. Indeed, each macroblock 110 refers to the macroblock to its immediate left (if it exists in the frame 100) in the sense that it is represented by a data unit that expresses the image data in the macroblock predictively, that is, the image data in this macroblock is expressed relative to the image data in the macroblock to the left. Conceptually, and somewhat simplified, the data unit expresses the macroblock 110 in terms of the change or movement relative to the left macroblock. Another possible understanding is that the data unit represents a correction of a predefined prediction operation that derives the macroblock 110 from the left macroblock. In an alternative within the scope of the present disclosure, a macroblock 110 may refer to another macroblock 110 to its right, or above or below it.

In FIG. 1B, the pattern of intra-frame references is denser. Here, each macroblock 110 refers to the macroblock to its immediate left (if it exists in the frame 100) and to the macroblock immediately above it (if it exists in the frame 100). Accordingly, the macroblock 110 is represented by a data unit that expresses the image data in the macroblock predictively, e.g., in terms of a difference, or in terms of a correction of a prediction of this image data based on a predefined interpolation operation (or some other predefined combination) acting on the image data in the left and upper macroblocks. The interpolation may include postconditioning operations such as smoothing. A further alternative, still within the scope of the present disclosure, is to use intra-frame references with directions opposite to that shown in FIG. 1B, i.e., starting in the lowest row.

An image/video format with a predefined pattern of intra-frame references can be associated with a specified scan order, which represents a feasible sequence for decoding the macroblocks. In FIG. 1A, the macroblock scan order is non-unique, namely, since each row can be decoded independently. For the pattern according to FIG. 1B, the macroblocks can be decoded either row-wise from above or column-wise from the left; a video format with this reference pattern may specify a column-wise or row-wise scan order, so that any reconstruction errors can be anticipated on the encoder side, which benefits coding efficiency. Further, there exist video formats with arbitrary macroblock ordering or so-called slicing.

Figure 2:
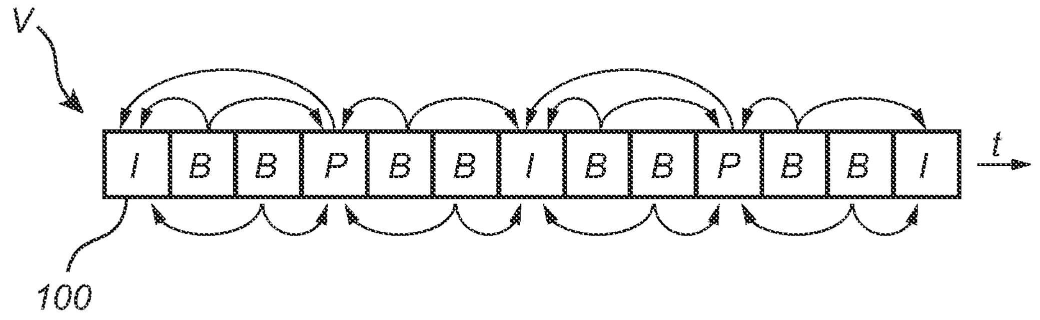
FIG. 2 shows a sequence of frames representing one group of pictures (GoP) with an example pattern of inter-frame references.

FIG. 2 shows a video sequence V including a sequence of frames 100. There are independently decodable frames (I-frame) and predictive frames in the video sequence V, including unidirectionally predictive frames (P-frame) and bidirectionally predictive frames (B-frame). Recommendation ITU-T H.264 (June/2019) "Advanced video coding for generic audiovisual services", International Telecommunication Union, specifies a video coding standard in which both forward-predicted and bidirectionally predicted frames are used. As seen in FIG. 2, the independently decodable frames do not refer to any other frame. The unidirectionally predictive frames (P-frames) in FIG. 2 are forward-predicted in that they refer directly to at least one other preceding or immediately preceding frame. The bidirectionally predictive frames (B-frames) can additionally refer directly to a subsequent or immediately subsequent frame in the video sequence V. A first frame refers indirectly to a second frame if the video sequence includes a third frame (or subsequence of frames) to which the first frame refers directly and which, in turn, refers directly to the second frame. In predictive video coding, a group of pictures (GoP) is defined as a subsequence of video frames that do not refer to any video frame outside the subsequence; it can be decoded without reference to any other I-, P- or B-frames. The video frames in FIG. 2 form a GoP. The GoPs in FIG. 2 are minimal since they cannot be subdivided into further GoPs.

In simpler implementations, a video sequence V may consist of independently decodable frames (I) and unidirectionally predictive frames (P) only. Such a video sequence may have the following appearance: IPPIPPPPIPPPIPPP, where each P-frame refers to the immediately preceding I- or P-frame. The following GoPs can be discerned in this example: IPP, IPPPP, IPPP, IPPP.

There are several options for coordinating inter-frame and intra-frame prediction coding. For example, if a static (fixed) macroblock partition is used in all video frames, the inter-frame references like those exemplified may be defined at the level of one macroblock position (e.g., upper left macroblock in FIGS. 1A and 1B) at a time. Some video formats allow dynamic macroblock partitions, e.g., a macroblock can be predicted either from the corresponding pixels in a preceding video frame or from spatially shifted pixels in the preceding frame. Alternatively, the inter-frame references are defined for entire video frames. An I-frame consists of I-blocks only, whereas a P-frame may consist of only P-blocks or a mixture of I-blocks and P-blocks.

Turning to FIG. 3, attention will now be directed to the video bitstream that encodes the video sequences under consideration. FIGS. 3A, 3B, 3C and 3D illustrate different correspondence patterns between data units 120 and the macroblocks 110 that they represent (encode). For purposes of the present disclosure, a data unit may have any suitable format and structure; no assumption is being made other than that the data unit can be separated (or extracted) from the video bitstream, e.g. to allow for processing, without any need to decode that data unit or any surrounding data units. A signed video bitstream further includes, in addition to the data units, signature units that are separable from the signed video bitstream in a same or similar manner. Details about signature units will be presented below with reference to FIG. 5.

Figure 3A:
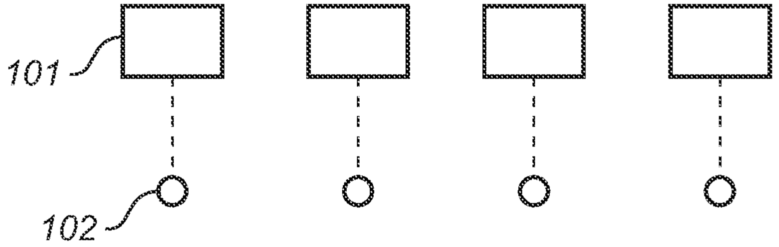
FIGS. 3A-3D show four example correspondence patterns between data units and the macroblocks that they represent.

Under one option, as illustrated in FIG. 3A, the data units 120 are in a one-to-one correspondence (dashed lines) to the macroblocks 110. This correspondence pattern allows each macroblock 110 to be always reconstructed from one data unit 120. Further, no other data unit 120 than the corresponding data unit 120 needs to be modified if a macroblock 110 is edited (although, certainly, modifications to signature units, metadata and the like may be necessary).

Figure 3B:
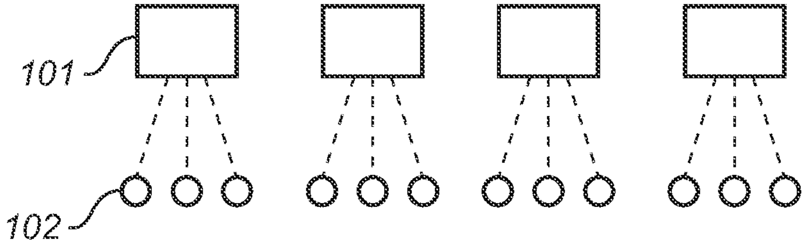

Alternatively, as illustrated in FIG. 3B, each macroblock 110 is encoded by multiple data units 120. Still each data unit 120 represents at most one macroblock 110. Therefore, if each macroblock 110 is encoded by at most M data units 120, then it follows that any macroblock 110 can be reconstructed from at most M data units 120. An edit made to a macroblock 110 has a direct effect on at most M data units 120. It is assumed that M is a small integer number, such as 1, 2, 3, 4, 5 or at most 10.

Figure 3C:
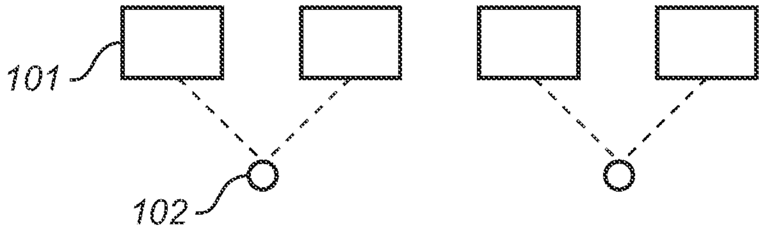

Under a further option, as illustrated in FIG. 3C, each data unit 120 encodes multiple macroblocks 110. This means that the effects of an edit made to a macroblock 110 are not limited to the macroblock 110 itself, but it may become necessary to re-encode and/or re-sign a data unit 120 that the edited macroblock 110 shares with a further macroblock 110. Because it may be computationally wasteful to perform the re-signing on an unnecessarily large data set, this correspondence pattern is not applied in the best-performing embodiment in the present disclosure though quite possible to implement. The total added computational effort may be kept limited if a data unit 120 is allowed to be shared by at most a predefined number N of macroblocks 110. Again, N may be specified to be a small integer number, such as 1, 2, 3, 4, 5 or at most 10

Combinations of the patterns seen in FIGS. 3B and 3C are possible within the scope of the present disclosure. As a result, the techniques proposed herein can be applied to video bitstream where the ratio of macroblocks 110 to data units 120 may be 2:1, 1:1, 2:2, 3:3, 4:2, 2:4 or 4:4.

Figure 3D:
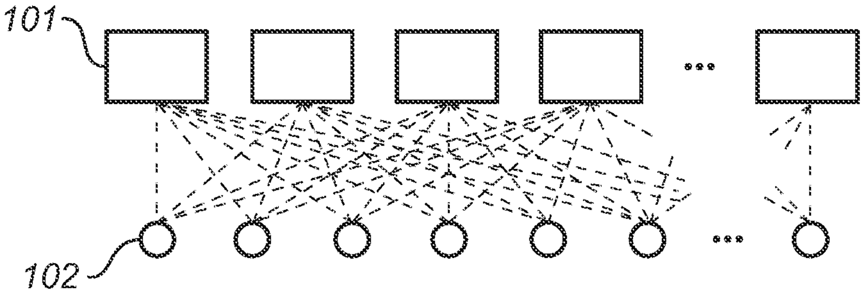

Under a still further option, as illustrated in FIG. 3D, each data unit 120 is allowed to represent any number of macroblocks 110 in the video sequence, and each macroblock 110 may be encoded by any number of data units 120. This correspondence pattern, as suggested by the dashed lines, could at worst imply that even a limited edit operation on a macroblock 110 will necessitate complete re-encoding and re-signing of the video sequence. The techniques disclosed herein are not to be practiced on video sequences with the structure shown in FIG. 3D.

Figure 4:
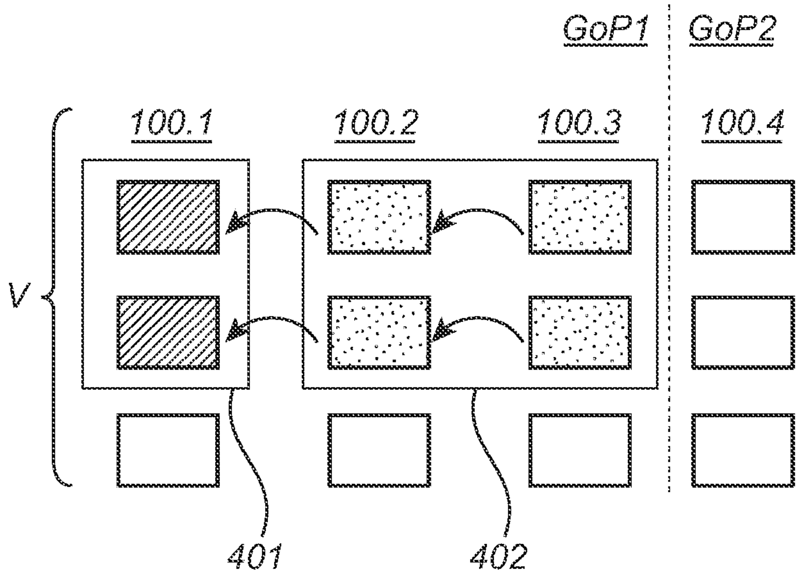
FIG. 4 illustrates an editing operation that directly affects some macroblocks in a first frame (first column) and leads to consequential changes in further frames (second and third columns) up until the end of the GoP.

FIG. 4 illustrates an editing operation to be described below.

Figure 5:
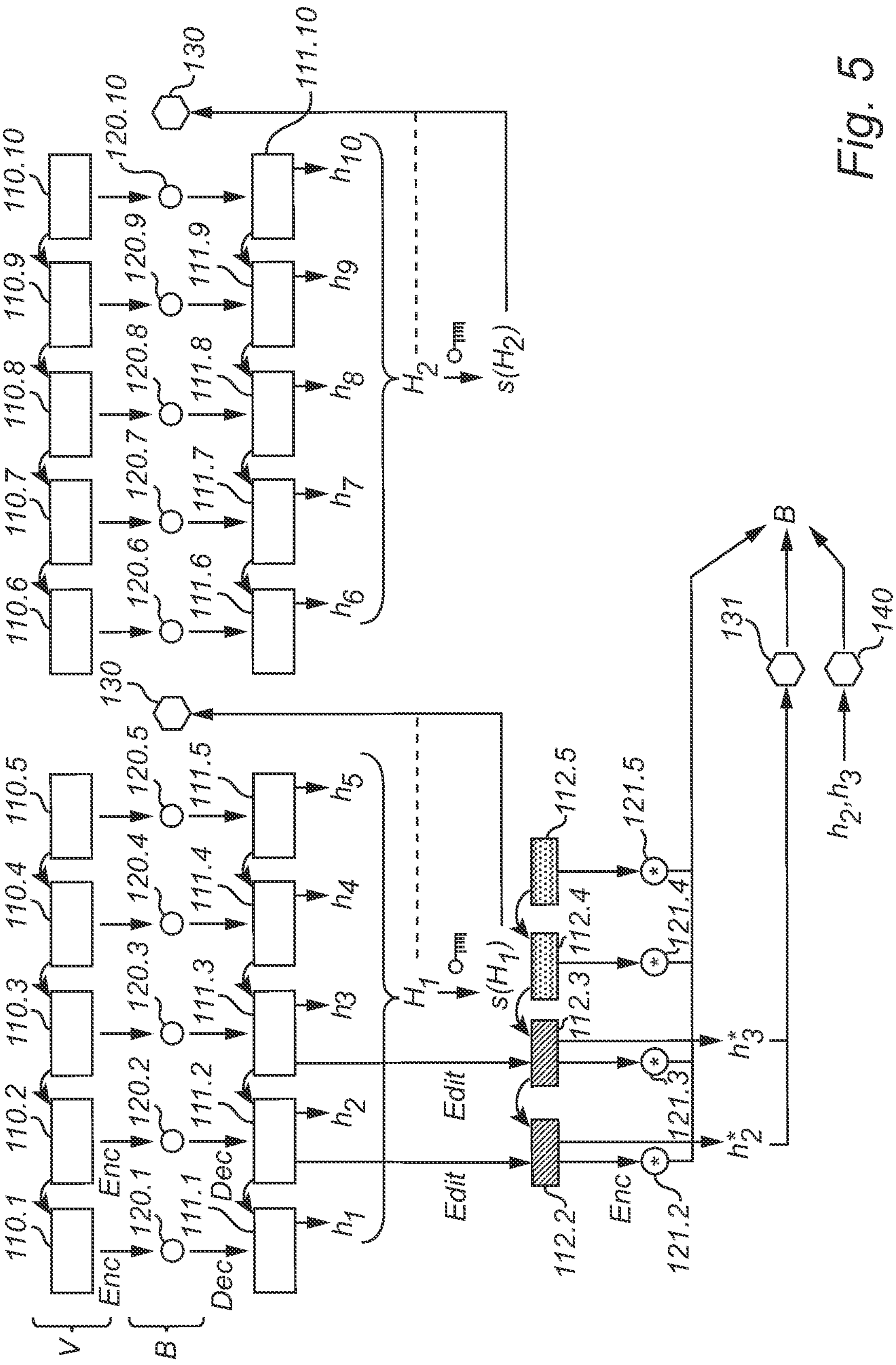
FIG. 5 illustrates, from top to bottom, a signed video bitstream, macroblocks reconstructed from the bitstream, and the effects of an editing operation performed on a portion of the video bitstream.

FIG. 5 depicts a section of a video sequence V including a succession of macroblocks 110 belonging to one or more video frames. For example, the macroblocks 110 may occupy a fixed position (e.g., upper left macroblock in FIGS. 1A and 1B) in consecutive video frames. The macroblocks

110 are assumed to have been predictively coded in accordance with the references indicated by curly arrows. It is seen that the first five macroblocks 110 belong to one GoP and the subsequent five macroblocks 110 belong to a next GoP. The video sequence V is encoded as a signed video bitstream B which includes data units 120 and signature units 130. For purposes of illustration, not limitation, FIG. 5 shows the data units 120 such that they encode the video macroblocks 110 in accordance with a correspondence pattern shown in FIG. 3A, that is, a one-to-one relationship between macroblocks 110 and data units 120. Put differently, each data unit 120.*n* has been created by applying an encoder Enc to a corresponding macroblock 110.*n*. The data units 120 may be in accordance with a proprietary or standardized video coding format, such as ITU-T H.264, H.265 or AV1. The bitstream B may further include, without departing from the scope of the present disclosure, additional types of units (e.g., dedicated metadata units).

Each of the signature units 130 can be associated with a plurality of data units 120. In FIG. 5, it is understood that the data units 120 between two consecutive signature units 130 are associated with the later signature unit 130; this is not an essential feature of the invention, and other conventions are possible without departing from the scope of this disclosure. A signature unit 130 could be associated with a set of data units 120 that are all contained in one GoP, but other association patterns are possible as well. Further, the set of data units 120 to be associated with one signature unit 130 is preferably selected in view of an applicable macroblock scan order. For instance, the set of data units 120 associated with a signature unit 130 could represent a number of macroblocks that are to be sequentially scanned during decoding, whereby the number of macroblocks that need to be revisited if a signature unit 130 fails to validate is minimized.

The signature unit 130 includes at least one bitstring (e.g., $H_1$) and a digital signature of the bitstring (e.g., $s(H_1)$). The presence of the bitstring is optional, as suggested by the use of dashed line. In the case where a signature unit 130 includes multiple bitstrings, the signature unit 130 may have one digital signature for all of these bitstrings, or multiple digital signatures for single bitstrings each or for subgroups of bitstrings each. The bitstring from which the digital signature is formed may be a combination of fingerprints computed based on macroblocks 111 reconstructed from the data units 120 associated with the signature unit 130, or the bitstring may be a fingerprint of said combination of fingerprints. More precisely, the fingerprints are fingerprints of the reconstructed macroblocks, which may be obtained by reading a so-called reference buffer in an encoder or by performing an independent decoding operation. The combination of the fingerprints (or 'document') may be a list or other concatenation of string representations of the fingerprints. In the ITU-T H.264 and H.265 formats, the signature unit may be included as a Supplemental Enhancement Information (SEI) message in the video bitstream. In the AV1 standard, the signature may be included in a Metadata Open Bitstream Unit (OBU).

Each of the fingerprints may be a hash or a salted hash. A salted hash may be a hash of a combination of the data unit (or a portion of the data unit) and a cryptographic salt; the presence of the salt may stop an unauthorized party who has access to multiple hashes from guessing what hash function is being used. Potentially useful cryptographic salts include a value of an active internal counter, a random number, and a time and place of signing. The hashes may be generated by a hash function (or one-way function) h, which is a cryptographic function that provides a safety level considered adequate in view of the sensitivity of the video data to be signed and/or in view of the value that would be at stake if the video data was manipulated by an unauthorized party. Three examples are SHA-256, SHA3-512 and RSA-1204. The hash function shall be predefined (e.g., it shall be reproducible) so that the fingerprints can be regenerated when the recipient is going to verify the fingerprints. In the example of FIG. 5, the bitstrings are given by $$H_1 = h([h_1, h_2, h_3, h_4, h_5])$$

and $$H_2 = h([h_6, h_7, h_8, h_9, h_{10}]),$$

where $h_1$, $h_2$, . . . are hashes of the macroblocks 111.1, 111.2, . . . and [·] denotes concatenation. The concatenation operation may be linear (juxtaposition) or may provide a staggered arrangement of the data. The concatenation operation may further include an arithmetic operation on the data, such as bitwise OR, XOR, multiplication, division or a modulo operation. Example salted hashes can be defined as $$H_1' = h([h_1, h_2, h_3, h_4, h_5], \sigma)$$

or $$H_1'' = h([h_1, h_2, h_3, h_4, h_5], \sigma),$$

where σ is the cryptographic salt. In the first example, the hash function h has a parametric dependence on the second argument, to which the salt σ has been assigned.

In some embodiments, each of the fingerprints $h_1, h_2, \ldots$ has been computed from a macroblock (e.g., pixel values or other plaintext data) reconstructed from the data unit 120. The fingerprint may be written $h_1=h(Y_{111.1})$ or $h_1=h([Y_{111.1}, \sigma])$ or $h_1=h(Y_{111.1}, \sigma)$, where $Y_{111.1}$ denotes data from a first one of the reconstructed macroblocks 111 and σ is the optional cryptographic salt. Under the third option, the hash function h has a parametric dependence on the second argument, to which the salt σ has been assigned. The fingerprint may be computed from the entire macroblock or from a subset thereof that has been extracted according to a pre-agreed rule. In variations of these embodiments, the fingerprints $h_1$, $h_2$, . . . are computed not on plaintext level but instead from intermediate reconstruction data derived from the data unit. More precisely, if an encoder is used that comprises a frequency-domain transformation (e.g., DCT, DST, DFT, wavelet transform) followed by a coding process (e.g., entropy, Huffman, Lempel-Ziv, run-length, binary or non-binary arithmetic coding, such as context-adaptive variable-length coding, CAVLC, context-adaptive binary arithmetic coding, CABAC), the transform coefficients will normally be available as intermediate reconstruction data at the decoder side. The transform coefficients can be restored from the coded representation. If the encoder further includes a quantization process immediately downstream of the transformation, the quantized transform coefficients will be available at the decoder side. In more complex codecs, with a greater number of sequential processing stages, there may be further types of intermediate reconstruction data, and these may be used for the fingerprint computation. It is particularly convenient to use a type of intermediate reconstruction data which, like the quantized transform coefficients, appears identically in the encoding process. Common to all the embodiments reviewed in this paragraph, a fingerprint pertains to exactly one data unit 120 which is one of the data units 120 associated with the signature unit 130.

Optionally, to discover unauthorized removal or insertion of data units, the fingerprints can be linked together sequentially. This is to say, each fingerprint has a dependence on the next or previous fingerprint, e.g., the input to the hash includes the hash of the next or previous fingerprint. The linking can for example be realized as follows: $h_1=h(Y_{111.1})$, $h_2=h([h_1, Y_{111.2}])$, $h_3=h([h_2, Y_{111.3}])$ etc., where $Y_{111.1}$, $Y_{111.2}$, $Y_{111.3}$ denote data from a first, second and third one of the reconstructed macroblocks 111. Another way of linking the fingerprints is: $h_1=h(Y_{111.1})$, $h_{12}=h([Y_{111.1}, Y_{111.2}])$, $h_{13}=h([Y_{111.2}, Y_{111.3}])$ etc.

Still with reference to the signature units 130 in FIG. 5, to generate the digital signature $s(H_1)$, a cryptographic element (not shown) with a pre-stored private key may be utilized. The recipient of the signed video bitstream may be supposed to hold a public key belonging to the same key pair (see also FIG. 10), which enables the recipient to verify that the signature produced by the cryptographic element is authentic but not generate new signatures. The public key could also be included as metadata in the signed video bitstream, in which case it is not necessary to store it at the recipient side.

Figure 6:
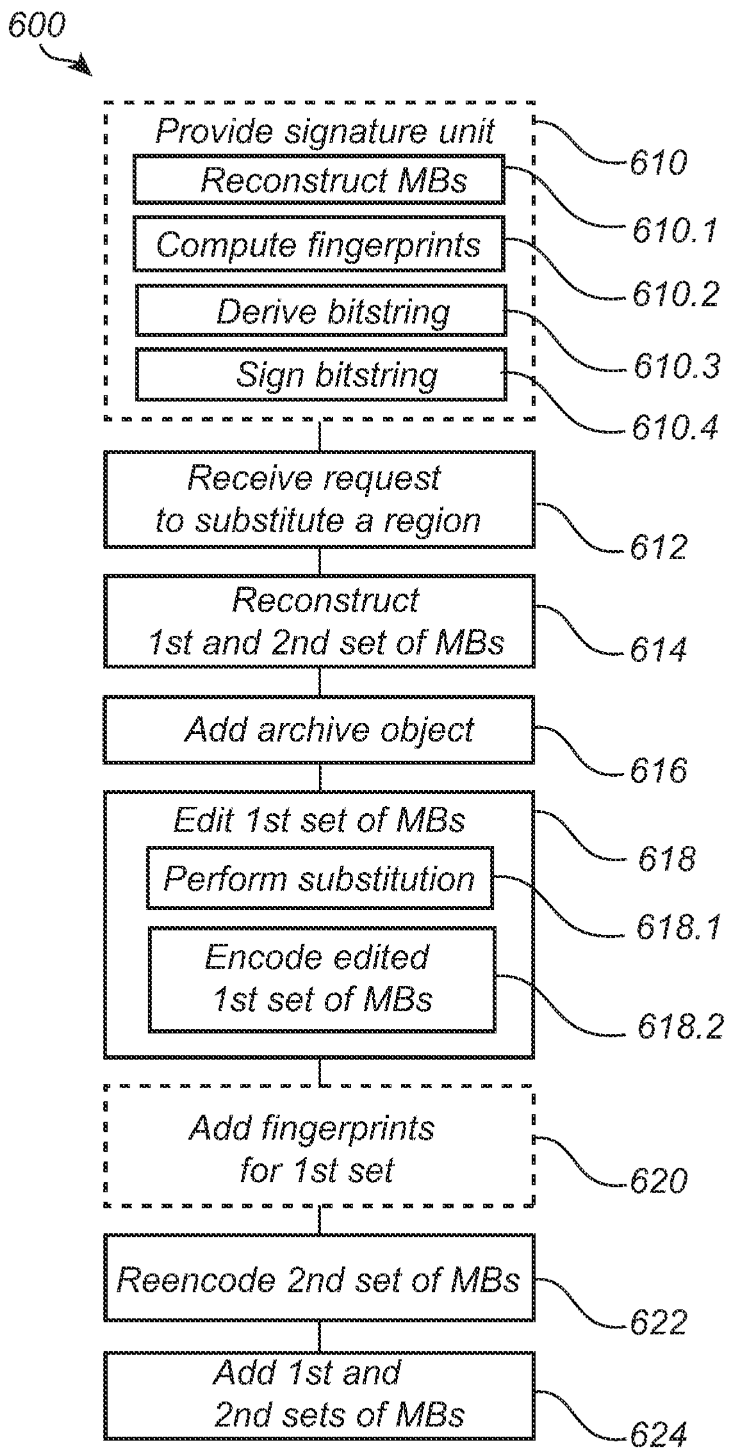
FIG. 6 is a flowchart of a method of editing a signed video bitstream, according to embodiments herein.

With reference to FIG. 6, there will now be described a method 600 of editing a signed video bitstream B obtained by prediction coding of a video sequence V. It is assumed that the non-optional steps of the method 600 are performed after the original signing of the video bitstream. For example, if the signed video bitstream is originally generated at a recording device, the editing method 600 may be performed in a video management system (VMS). Another example use case is where the signed video bitstream is generated at a device, is stored in memory and is then revisited for editing using the same device. The editing may take place at a later point in time, e.g., after a need to perform privacy masking has become known.

Figure 8:
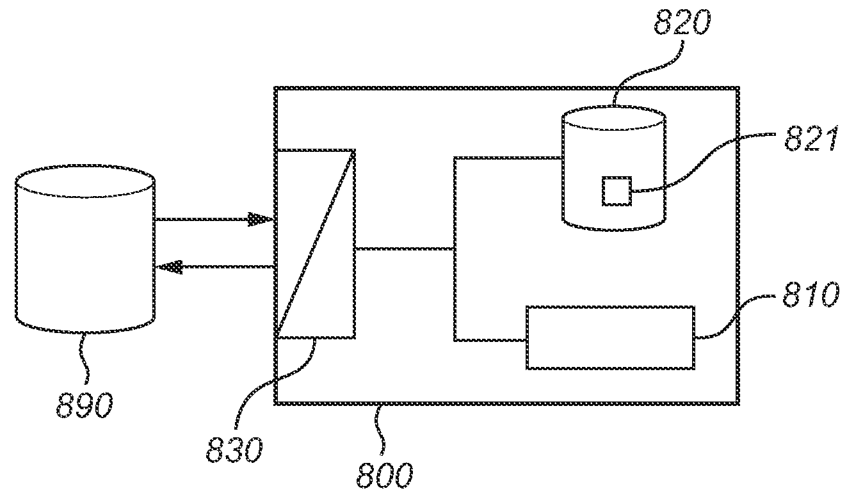
FIG. 8 shows a device suitable for performing the methods illustrated in FIGS. 6 and 7.

Although, as noted, the device performing the editing method 600 may be an application or system dedicated for a particular purpose, it may have the basic functional structure shown in FIG. 8. As illustrated, device 800 includes processing circuitry 810, memory 820 and an external interface 830. The memory 820 may be suitable for storing a computer program 821 with instructions implementing the editing method 600. The external interface 830 may be a communication interface allowing the device 800 to communicate with an analogous device (not shown) held by a recipient and/or a video content author (e.g., a recording device), or it may allow read and write operations in an external memory 890 suitable for storing video bitstreams.

Figure 9:
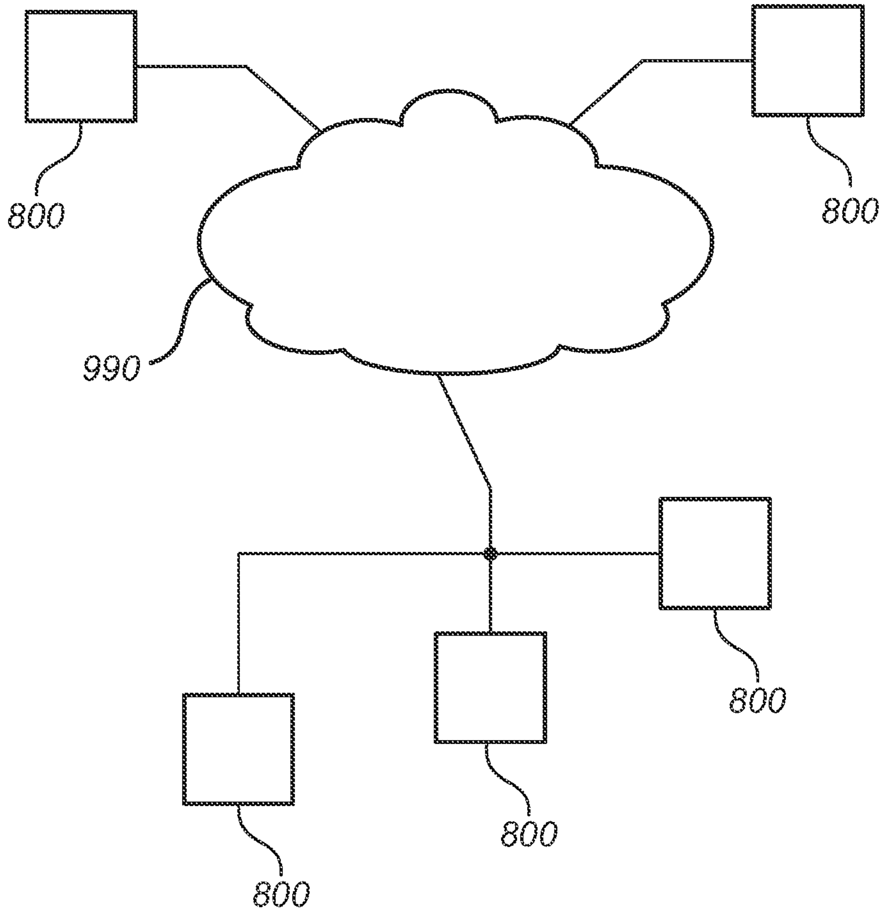
FIG. 9 shows a number of such devices, which are connected over a local-area and/or a wide-area network.

FIG. 9 illustrates the case where a bitstream is transferred among multiple devices. It is noted that the device performing the editing method 600 may be connected to the recipient device over a local-area network (connection lines in lower half of FIG. 9) or over a wide-area network 990. Attacks on the bitstream B can occur on either type of network, which justifies the signing.

Returning to FIG. 6, one embodiment of the method 600 begins with a step 612 of receiving a request to substitute a region of at least one video frame 100 in a video sequence V. The request may be received via a human-machine interface from a human operator or in an automated way, e.g., in a message from a control application executing on the same device 800 or remotely. The region to be substituted may be a set of substitute pixel values, such as a privacy mask, which is to replace analogously located pixels in the video sequence V.

For the avoidance of doubt, it is noted that the video sequence V to be edited is encoded by prediction coding as a signed video bitstream B, which includes, data units 120 and associated signature units 130, wherein each data unit represents at most one macroblock 110 in a video frame 100 of the prediction-coded video sequence V, and wherein each signature unit includes a digital signature of a bitstring derived from a plurality of fingerprints relating to exactly one associated data unit each. Such a bitstream format has been exemplified with reference to FIG. 5.

In a next step 614 of the method 600, a first set of macroblocks, in which said region is contained, and a second set of macroblocks referring directly or indirectly to macroblocks in the first set are determined and reconstructed. In FIG. 5, the reconstruction corresponds to the arrows symbolizing the decoding operation Dec. Recalling that bidirectionally predictive frames (B-frames) can be defined in some video coding formats, it is appreciated that the second set of macroblocks can be located before or after the first set of macroblocks, or occupy both of these locations. It is understood that the first and second sets are defined to be disjoint. For example, it may be stipulated that a macroblock belongs to the second set only if it does not belong to the first set, i.e., only if this macroblock is not needed in order to form a set of macroblocks that contains the region to be substituted. It follows that the second set of macroblocks is normally empty if the first set of macroblocks extends up to the boundary of a GoP. It is appreciated, further, that the second set of macroblocks may contain macroblocks in more than one P-frame or more than two B-frames since, depending on the video encoder initially used, additional frames may use the substituted region as reference. In step 614, it may be necessary to reconstruct more macroblocks than just the first and second sets as a result of inter-frame or intra-frame prediction references between macroblocks. More precisely, one or more macroblocks located earlier in a chain of prediction references that leads up to the first and second sets of macroblocks may have to be reconstructed first.

If the region to be substituted is limited to a single video frame, the first set of macroblocks can be determined with reference only to the macroblock partition of the frame. More precisely, the first set is all macroblocks with which the region overlaps (that is, the macroblocks with which the region has a non-empty intersection in pixel space). If the region extends to multiple frames, this operation is repeated for each frame. In the special case where the region repeats identically in all of the video frames and additionally the macroblock partition is constant across all said frames, the first set of macroblocks is a copy of those determined (by the overlap criterion) for the initial frame for each of the following frames. The second set of macroblocks can be determined on the basis of the first set and the pattern of intra-frame and inter-frame references in the signed prediction-coded video sequence. Because such references by definition do not extend past GoP boundaries, the search for macroblocks to be included in the second set can be restricted to that GoP or those GoPs to which the first set of macroblocks belong.

A possible outcome of step 614 is illustrated in FIG. 4, where each column represents one video frame of a video sequence V and each row represents one macroblock at a particular position in the frame (e.g., upper left macroblock). In FIG. 4, further, references between macroblocks have been indicated as curly arrows, and a boundary between two consecutive GoPs, GoP1 and GoP2, has been shown as a dashed vertical line. It is noted that the inter-frame references are defined at the level of one macroblock positions in FIG. 4. Further, the diagonally hashed macroblocks are those directly affected by the request to substitute the region; they are all located in the 1st frame and form the first set 401 of macroblocks. The macroblocks with dotted shading are all macroblocks that refer directly (2nd frame) or indirectly (3rd frame) to the macroblocks in the first set, and they are identified as the second set 402 of macroblocks. In line with expectation, the second set of macroblocks does not extend past the GoP boundary.

It is noted that the composition of the first and second sets of macroblocks seen in FIG. 4 could be altered if an intra-frame reference is introduced but not necessarily. For example, if the macroblock position corresponding to the first row refers to the macroblock position corresponding to the second row, the first and second sets of macroblocks 401, 402 would remain unchanged.

In FIG. 5, the first set consists of macroblocks 111.2 and 111.3, and the second set consists of macroblocks 111.4 and 111.5.

In a next step 616, an archive object 140 is added to the signed video bitstream B. The archive object 140 includes fingerprints $h_2$, $h_3$ computed from the reconstructed first set of macroblocks. At the level of the signed video bitstream B, the archive object 140 can have a similar format as the data units 120 and signature units 130, in that the archive object 140 can be separated from the video bitstream without decoding. The fingerprints $h_2$, $h_3$ are not necessarily computed by the entity that performs the method 600. Indeed, if the bitstream B is according to the 'document approach' where the signature units 130 contain bitstrings, these fingerprints are already available from one of the signature units 130. It is noted, furthermore, that if the signature units 130 in the bitstream B contain such bitstrings, the step 616 can be performed as soon as the first set of macroblocks has been determined, that is, before completion of step 614.

Optionally, each archive object 140 may include a digital signature of these fingerprints, or a digital signature of a combination of these fingerprints in this archive object 140, or it may include a digital signature of a fingerprint of said combination. Further optionally, the archive objects 140 may as well include positions of the first and second sets of macroblocks, the signatures of which have been archived. A position may refer to the macroblock's position in a frame, e.g., in frame coordinates, and this in turn corresponds to a position in the bitstring. If a static macroblock partition is used, the position of a macroblock 111 can be expressed as a macroblock sequence number or another identifier. For example, the bitstring may be formed by concatenating the fingerprints in the same order as the macroblock sequence in a frame.

A further step 618 of the method 600 will be illustrated with reference to the lower left portion of FIG. 5. In this step, an editing operation Edit transforms the first set of macroblocks 111.2, 111.3 into an edited first set of macroblocks 112.2, 112.3. The editing of the first set of macroblocks are in accordance with the request to substitute a region of the video frame. Then, still within step 618, the edited first set of macroblocks 112.2, 112.3 are encoded as a first set of new data units 121.2, 121.3.

The edited first set of macroblocks 112.2, 112.3 can be encoded using regular encoder settings, regular GoP pattern etc., i.e., in the same way as the video bitstream B was created. Optionally, the edited first set of macroblocks 112.2, 112.3, which results after the substitution, are instead encoded as independently decodable data units. Each independently decodable data unit may correspond to an I-frame in the H.264 or H.265 coding specifications, an encoded macroblock that does not refer to another macroblock, or data units equivalent to these. This is in line with the inventors' realization that the substitution introduces a sudden temporal change in the video sequence; concretely, the edited macroblock 112.2 will likely differ considerably from the immediately preceding not-edited macroblock 111.1, which could lessen performance of the prediction coding. A further option is to encode the edited first set of macroblocks 112.2, 112.3 losslessly and/or using reduced data compression. This is to be understood against the background that the video sequence V is encoded at a predetermined regular level data compression. More precisely, it is foreseen that the edited first set of macroblocks 112.2, 112.3 are encoded at a reduced level of data compression in comparison with the regular data compression.

Step 620 of the method 600 is optional and will be described separately.

In the next non-optional step 622, the second set of macroblocks 112.4, 112.5 are reencoded as a second set of new data units 121.4, 121.5. The reencoding shall preferably alter the visual appearance of the second set of macroblocks 112.4, 112.5 minimally. Ideally, the image data (e.g., pixel data or other plaintext data) obtained by decoding of new data units 121.4, 121.5 shall be identical or visually inseparable from the second set of macroblocks 112.4, 112.5. To achieve this, however, the reencoding operation in step 622 may modify prediction-coding settings and/or modify the encoding process. In particular, the encoding process may be modified as regards the level of data compression, wherein lossy coding (at regular data compression) is replaced by a less lossy coding (reduced data compression) or lossless coding. Lossless coding may include representing the second set of macroblocks 112.4, 112.5 as unencoded, 'raw' blocks, such as a plain list of the original values for each position in the macroblock in an appropriate color space. If some type of lossy coding is used for the second set of macroblocks 112.4, 112.5, then it may be advantageous to combine this with robust hashing, notably robust hash verification. This way, the macroblocks to be reconstructed from the new data units 121.4, 121.5 are accepted as authentic in relation to the original signature units 130 even if the image quality of these macroblocks degrades slightly.

As regards the modifying of the prediction-coding settings, it may be advantageous in important use cases (e.g., masking, blurring) to use non-predictive coding. Again, the substitution introduces a sudden temporal change in the video sequence in that the edited macroblock 112.3 will likely differ considerably from the immediately subsequent not-edited macroblock 112.4, which could lessen the coding performance if prediction coding is applied. In use cases where the coding performance is not a major concern, or where the editing operation is of a more unnoticeable nature (e.g., filtering, enhancements), predictive coding can be used. Because of the prediction references (curly arrows in FIG. 5), the image data in the second set of macroblocks 112.4, 112.5 is now to be expressed relative to the image data in the edited first set of macroblocks 112.2, 112.3, which typically necessitates an update. As a consequence, the content of the second set of new data units 121.4, 121.5 will differ from the data units 120.4, 120.5.

The first and second sets of new data units 121.2, 121.3, 121.4, 121.5 are then added, in a step 624, to the signed video bitstream B. Concurrently, the corresponding original data units 120.2, 120.3, 120.4, 120.5 may be removed from the video bitstream B. In some embodiments, step 624 is the final act within the editing method 600.

In some embodiments, the method 600 further comprises a step 620 of adding fingerprints $h_2$*, $h_3$* which are computed from the edited first set of macroblocks 112.2, 112.3 to the video bitstream B. The fingerprints can be added either by replacing a signature unit 130, which is associated with the data units 120.2, 120.3 that encode the first set of macroblocks, with a substitute signature unit (not shown), which includes a digital signature of a bitstring derived from at least the computed fingerprints $h_2$*, $h_3$*. For example, the bitstring may be derived from the computed fingerprints $h_2$*, $h_3$* and fingerprints of one or more not-edited macroblocks, so that the full frame 100 or a portion therefore can be conveniently validated using a single signature unit. The substitute signature unit may be obtained by editing an existing signature unit, notably by extending it with a further digital signature. Alternatively, at least one new signature unit 131, which includes a bitstring derived from a digital signature of the computed fingerprints $h_2$*, $h_3$*, is added to the video bitstream B. The new signature unit 131 may have the same structure as the signature units 130 described above.

Optionally ('document approach'), the substitute signature unit and the new signature unit 131 could further contain the bitstring itself which has been digitally signed.

It is noted that there is usually no need to compute and include fingerprints of the second set of macroblocks, as these will remain susceptible of validation using a suitable one of the existing signature units 130 in the video bitstream B. The optional step 620 can be performed at any point in the method 600 after the edited first set of macroblocks 112.2, 112.3 are available.

In still other embodiments, the method 600 further includes an initial step 610 of providing at least one signature unit 130. It is understood that, in use cases believed to be of primary interest, step 610 is performed by a different entity than steps 612, 614, 616, 618, 620, 622 and 624 of the method 600, and/or step 610 is performed at an earlier point in time. Either way, step 610 is separated from the subsequent steps 612, 614, 616, 618, 620, 622 and 624 by a relatively unsecure data transfer and/or a storage period that justifies signing to ensure the desired level of data security.

The optional step 610 may comprise the substeps of reconstructing 610.1 a plurality of macroblocks from respective data units 120 associated with the signature unit; computing 610.2 a plurality of fingerprints from the respective reconstructed macroblocks; deriving 610.3 a bitstring from the computed fingerprints, wherein the bitstring is a combination of said plurality of fingerprints or a fingerprint of said combination; and obtaining 610.4 a digital signature of the bitstring. Suitable implementations of the fingerprint computation 610.2, the bitstring derivation 610.3 and the digital signing 610.4 have been discussed in detail above. In particular, the bitstring to which the digital signature in the signature unit 130 pertains may be a combination of fingerprints of the associated data units 120, or it may be a fingerprint of said combination of fingerprints of the associated data units 120. The combination (or 'document') may be a list or another concatenation of respective string representations of the fingerprints.

Having thus completed the description of the editing method 600, attention is now directed to the recipient side. More precisely, with reference to the flowchart in FIG. 7, a method 700 of validating a signed video bitstream B will be described. It is again assumed that the signed video bitstream B has been obtained by prediction coding of a video sequence V and, optionally, by subsequent editing operations. It is not essential that the signed video bitstream B has been processed according to the editing method 600. It is moreover assumed that the signed video bitstream includes data units 120, associated signature units 130 and an archive object 140. Here, each data unit 120 represents one macroblock 110 in a frame 100 of the prediction-coded video sequence V, each signature unit 130 includes a digital signature (e.g., $s(H_1)$, $s(H_2)$) of a bitstring (e.g., $H_1$, $H_2$) and optionally the bitstring itself, and the archive object 140 includes at least one fingerprint, which may be an archived fingerprint relating to a data unit that is now absent from the bitstream B and/or has undergone editing. It is irrelevant for the validation method 700, and usually not possible to determine at the recipient side, whether a particular signature unit 130 was added in connection with editing (e.g., by the editing method 600) or it was part of the original, not-edited bitstream B.

In a first step 710 of the method 700, macroblocks 113 are reconstructed from those data units 120, 121 that are associated with a signature unit 130. The reconstruction includes a decoding process symbolized in FIGS. 10A and 10B by the top row of downward arrows.

In next step 712 of the method 700, respective fingerprints $\overline{h_1}$, $\overline{h_4}$, $\overline{h_5}$ are computed from at least some of the reconstructed macroblocks 113. Fingerprints are not computed from the second and third macroblocks 113.2, 113.3 (first set), which because of the editing within method 600, differ from the corresponding original macroblocks in the video sequence V. The fact that the second and third macroblocks 113.2, 113.3 belong to the first set may be indicated in metadata in the edited video bitstream B or may be evident from encoder timestamps on the corresponding data units 121.1, 121.3. A still further option may be to include the original editing request (request to substitute a region of a video frame) in the video bitstream B after editing, from which the recipient can determine which macroblocks are changed.

In a third step 714, which may in principle be performed before or overlapping with step 712, at least one archived fingerprint is retrieved from the archive object 140. In the example shown in FIGS. 10A and 10B, fingerprints $h_2$, $h_3$ for the second and third macroblocks 113.2, 113.3 are obtained in this way. It is noted that only fingerprints $\overline{h_1}$, $\overline{h_4}$, $\overline{h_5}$ can cause the validation in the forthcoming fourth step 716 to fail, in which case the failure suggests that an unauthorized manipulation of the bitstream B has taken place.

In a step 716, after fingerprints for all macroblocks has been obtained in steps 712 and 714, a bitstring $\overline{H}_1$ is derived from these fingerprints. This may be done according to a pre-agreed rule, e.g., by a procedure analogous to those described within step 610.3. It is recalled that the bitstring may be a combination of the obtained fingerprints or it may be a fingerprint of said combination of fingerprints.

In a next step 718, the data units 120, 121 associated with the signature unit 130 are validated using the digital signature $s(H_1)$ in the signature unit 130. For the avoidance of doubt, it is noted that the validation in step 718 of the data units is indirect, without any necessary processing that acts on the data units themselves.

Figure 10A:
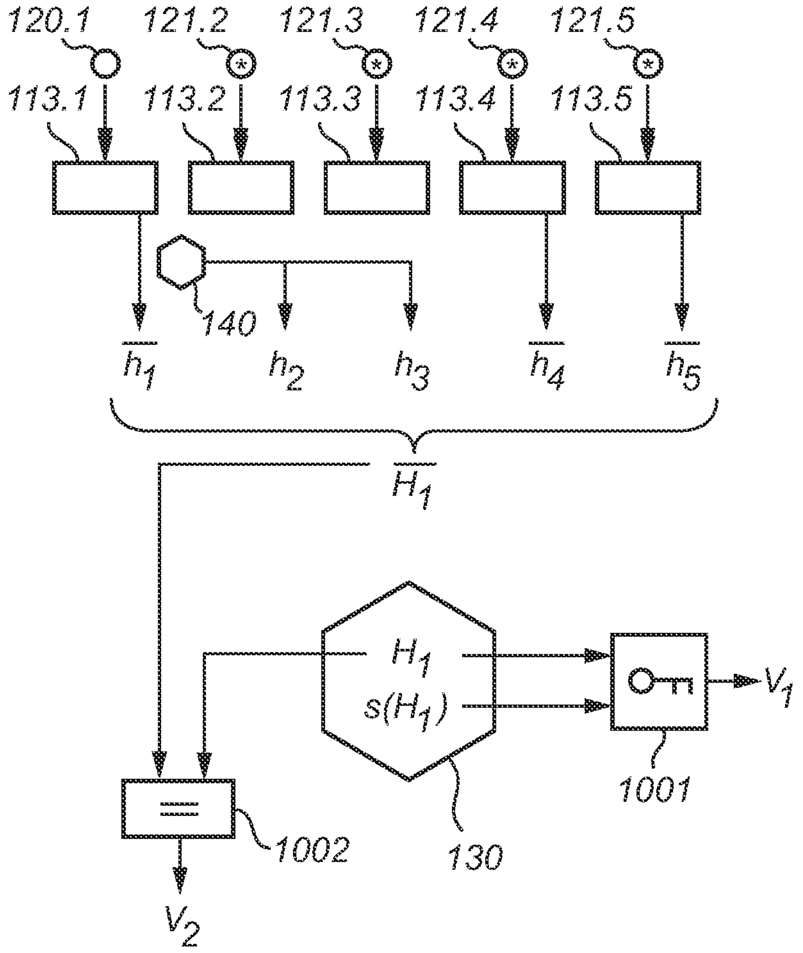
FIGS. 10A ('document approach') and 10B show a signed video bitstream and some of the operations within the method illustrated in FIG. 7.
Figure 10B:
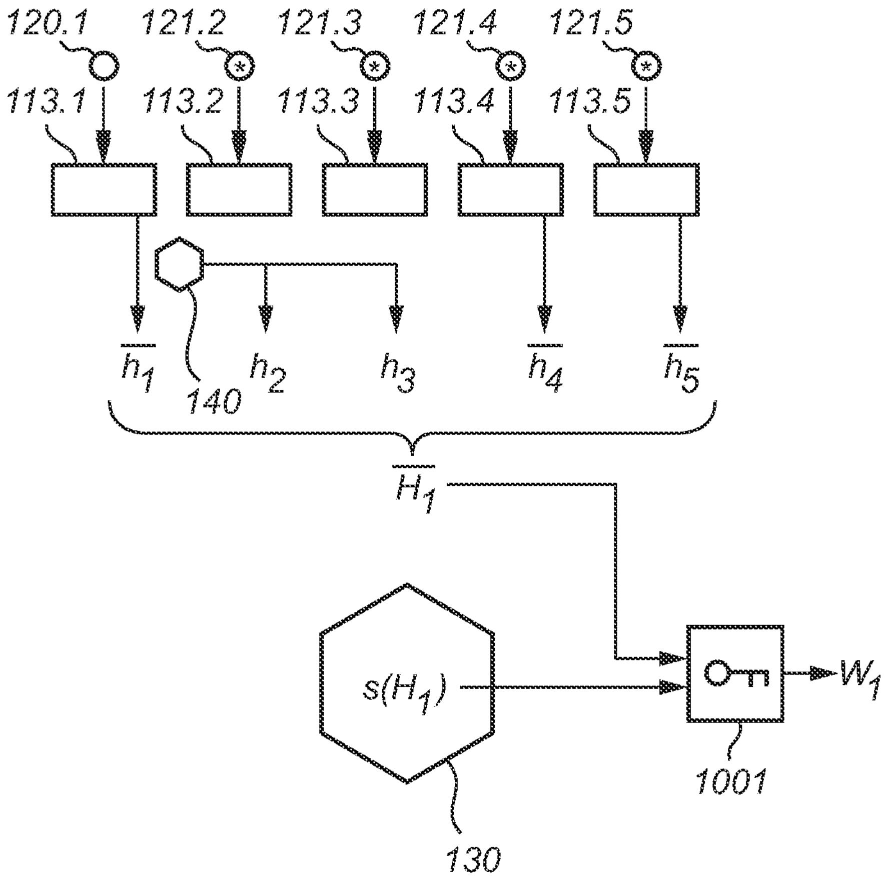

In embodiments where the signature units 130 do not contain the bitstring $H_1$, step 718 is executed by verifying the derived bitstring $\overline{H}_1$ using the digital signature $s(H_1)$. For example, the derived bitstring $\overline{H}_1$ can be verified using a public key belonging to the same key pair as the private key which was used to generate the digital signature $s(H_1)$. In FIG. 10B, this is illustrated by feeding the derived bitstring $\overline{H}_1$ and digital signature $s(H_1)$ to a cryptographic entity 1001 where the public key is stored, which outputs a binary result W1 representing the outcome of the verification.

Alternatively, in embodiments where the signature units 130 do contain the bitstring $H_1$ ('document approach'), step 718 may be performed in two substeps. In a first substep, the bitstring $H_1$ is verified, e.g., using a public key belonging to the same key pair as the private key which was used to generate the digital signature $s(H_1)$, as explained just above. This is illustrated in FIG. 10A by the functional block 1001 and the binary result V2. In a second substep, then, the verified bitstring $H_1$ is compared with the bitstring $\overline{H}_1$ that was derived in step 716. The comparison may be a bitwise equality check, as suggested by the functional block 1002 in FIG. 10A, which yields a true- or false-valued output V2. If both results V1, V2 are true, then it may be concluded that the signed video bitstream 100 is authentic as far as this signature unit 130 is concerned.

The execution of the method 700 may then include repeating relevant ones of the above-described steps 710, 712, 714, 716, 718 for any further signature units 130 in the signed video bitstream B. If the outcome is positive for all signature units 130, it is concluded that the signed video bitstream B is valid, and it may be consumed or processed further. In the opposite case, the signed video bitstream B shall be considered unauthentic, and it may be quarantined from any further use or processing.

As already mentioned, steps of any method disclosed herein do not have to be performed in the exact order described, unless explicitly stated. This is illustrated notably by the validation method 700, wherein it is clearly possible to perform step 714 before, between or after the steps 710 and 712, as desired.

It is noted that the validation of the data units in the first set is based on a different trust relationship than the validation of the data units in the second set. The data units in the first set are validated by trusting the entity that created the digital signature $s(H_1)$, that is, the holder of the private key if asymmetric key cryptography is used. The data units in the second set are validated by trusting the entity which edited the signed bitstream B and created the archive objects.

In some embodiments of the validation method 700, the deriving 716 of the bitstring comprises a decision 716.1 whether to compute a needed fingerprint from a reconstructed macroblock 111 or retrieve it from the archive object 140. This decision can be guided by position information in the archive object 140. The position information indicates positions of the macroblocks 110 which are represented by the data units 120 to which the archived fingerprints relate. Having access to these macroblock positions allows the recipient to perform a reliable completeness check, based on an assumption along the following lines: any macroblock 110 in a video frame 100 which cannot be reconstructed from the data units 120 in the signed video bitstream B is encoded by another data unit whose fingerprint can necessarily be retrieved from an archive object 140. If the archive object 140 does not indicate the positions of these macroblocks, the recipient may for example insert the missing fingerprints—those that are not computable from the data units 120 in the signed video bitstream B—by a trial and error approach. The trial and error approach may include executing steps 714 and 716 for each of the possible ways of inserting the archived fingerprints from the archive object 140 (each such way of inserting can be imagined to be a permutation of the positions of the missing macroblocks), and to conclude that the signed video bitstream B is unauthentic only if all of these executions fail.

Figure 7:
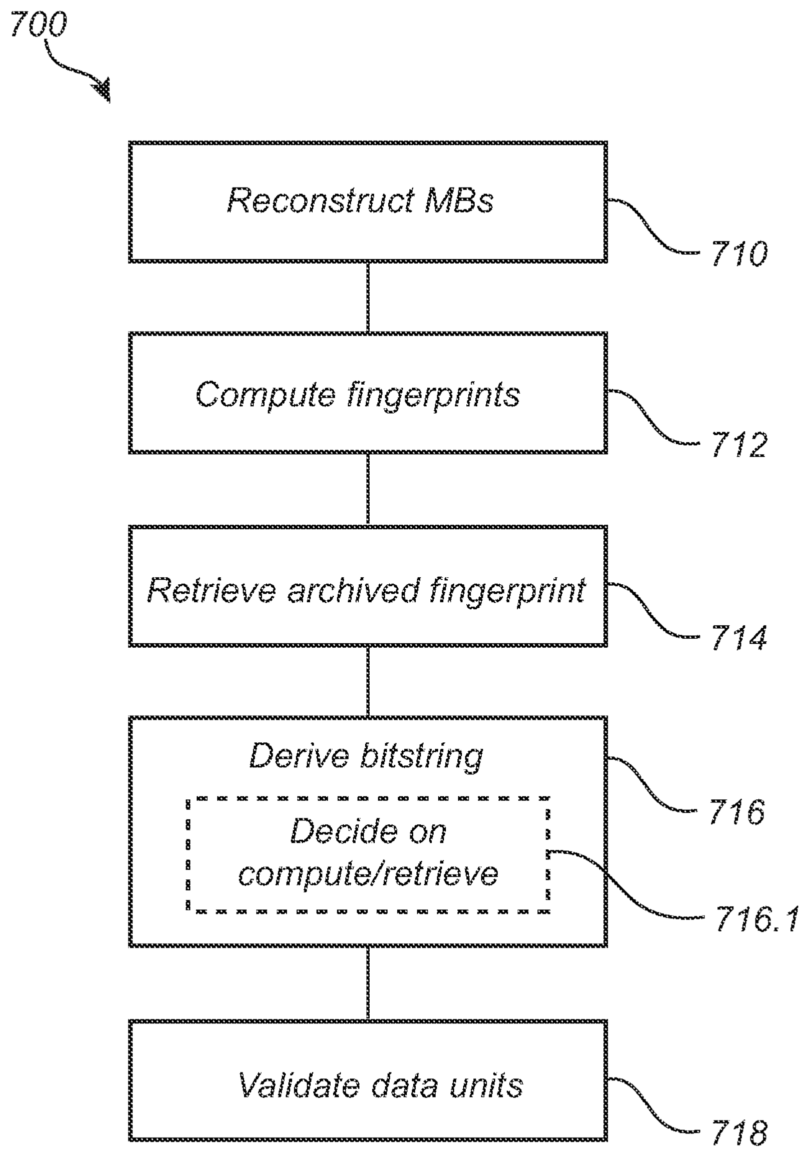
FIG. 7 is a flowchart of a method of validating a signed video bitstream, according to embodiments herein.
Figure 11:
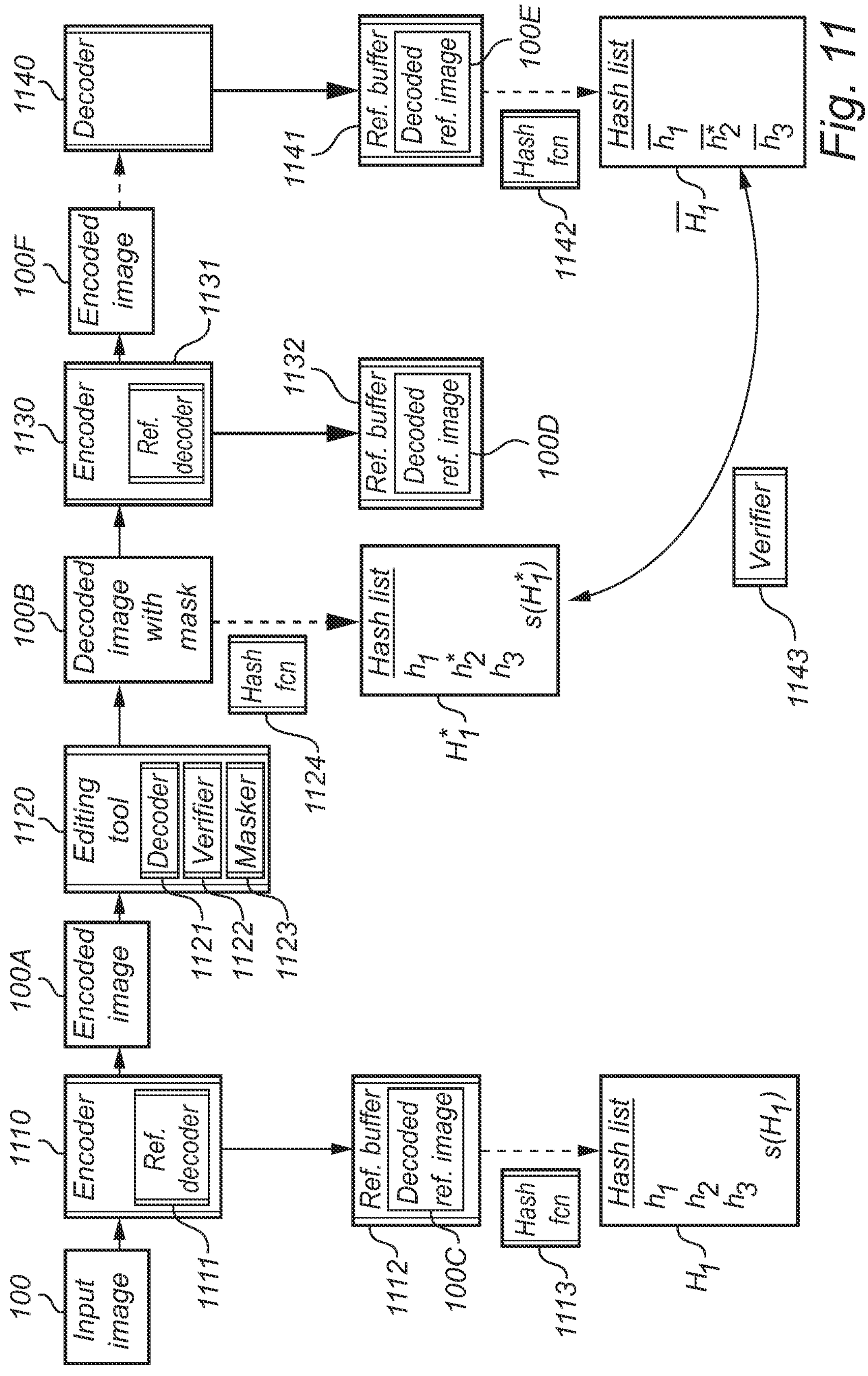
FIG. 11 illustrates signal processing operations and data flows occurring during an execution of the methods depicted in FIGS. 6 and 7, as well as functional units suitable for performing the signal processing operations.

By way of overview, FIG. 11 illustrates signal processing operations and data flows occurring during an execution of the editing method depicted in FIG. 6 and the validation method of FIG. 7, as well as functional units suitable for performing the signal processing operations. The time evolution of the signal processing flow is generally directed from left to right. Data and signals have been drawn as simple frames, whereas functional units have been represented as frames with double vertical lines. Each functional unit may correspond to a programmable processor executing a segment of software code, or a network of such processors. It is also possible to implement each functional unit as dedicated hardware circuitry, such as an application-specific integrated circuit (ASIC) or field-programmable gate array (FPGA). From another perspective, the functional units may be considered to represent respective portions of software code (e.g., modules, routines), which execute on a common processor or processor network.

It is assumed that initially, an input image 100 in a plaintext format is fed to an encoder 1110 configured for a predictive video coding format. The encoder 1110 outputs an encoded image 110A. The encoded image 110A may be formatted like the video bitstream described with reference to FIG. 5, to include inter alia data units corresponding to macroblocks joined by inter-frame or intra-frame prediction references. In order to ensure correct prediction coding, the encoder 1110 comprises a reference decoder 1111, which is configured to reconstruct image data from the data units as they are created by an encoding process in the encoder 1110, e.g., in a quasi-continuous way. The reconstructed image data, which may be considered to form a decoded reference image 100C, is temporarily stored in a reference buffer 1112 associated with the encoder 1110. More precisely, in order to express the image data in a first macroblock relative to the image data in a second macroblock, the encoder 1110 computes an increment not from the original second macroblock (i.e., as provided in the input image 100) but from the second macroblock in the decoded reference image 100C. A hash function 1113 computes fingerprints $h_1$, $h_2$, $h_3$ from the macroblocks of the decoded reference image 100C, which are gathered (e.g., concatenated) into a hash list $H_1$. The hash list $H_1$ may be a bitstring. As explained above, the hash list $H_1$ may be digitally signed, and a resulting digital signature $s(H_1)$ may be carried in a signature unit in the video bitstream.

It is assumed that a request to mask a region of the image is received from a user. To execute the user's request, the encoded image 100A is input to an editing tool 1120, which comprises a decoder 1121, an optional verifier 1122 and a masker 1123. The decoder 1121 is configured to reconstruct image data, in particular macroblocks, from the encoded image 100A. Nominally, the image reconstructed from the encoded image 100A is identical to the decoded reference image 100C. The presence of the verifier 1122 in the editing tool 1120 may be justified in particular if the encoded image 100A has been transferred over an untrusted connection, in which case a validation may be carried out before the masking is performed. The expected result of the validation is that the encoded image 100A is authentic, in which case it is meaningful to perform the masking. The masker 1123 is configured to substitute a pre-specified color or pattern in a region of the image. The substitution produces a masked decoded image 100B, which is transferred (over a trusted connection) to a second encoder 1130. In the masked decoded image 100B, at least the edited portions (edited macroblocks) are in plaintext format. It may be advantageous to forgo the decoding of the not-edited portions to the extent practicable. The second encoder 1130 outputs a further encoded image 100F, which can be made available to a recipient. Like the first encoder 1110, the second encoder 1130 comprises a reference decoder 1131 configured to reconstruct image data from data units created by an encoding process in the second encoder 1130. The reconstructed image data—a decoded reference image 100D—is temporarily stored in a reference buffer 1132 associated with the second encoder 1130.

To ensure that the edited and then encoded image can be validated, a hash list $H_1$* is computed from the masked decoded image 100B using a hash function 1124. (This corresponds to the optional step 620 of the editing method 600 described above.) The fingerprints relating to edited macroblocks (here: $h_2$*) are likely to have changed as a result of the masking, whereas the remaining fingerprints (here: $h_1$, $h_3$) may coincide with those computed from the original decoded reference image 100C. The new hash list may be provided with a digital signature s($H_1$*). Alternatively, the hash list $H_1$* is computed from the decoded reference image 100D in the reference buffer 1132 associated with the encoder 1130.

It is noted that the encoder 1110 may be controlled by a different entity (e.g., author) than the editing tool 1120 and second decoder 1130. The editing tool 1120 and second decoder 1130 are preferably co-located or linked by a trusted data connection, since the masked decoded image 100B could otherwise be tampered with before it reaches the encoder 1130.

On a recipient side, there is provided a decoder 1140 which operates a decoding process configured to reconstruct a decoded reference image 100E from the further encoded image 100F. From the decoded reference image 100E, a hash list $\overline{H}_1$ can be computed using a further hash function 1142. A verifier 1143 associated with the decoder 1140 attempts to verify that this hash list $\overline{H}_1$ is consistent with (e.g., identical to) the hash list $H_1$* computed from the masked decoded image 100B or the decoded reference image 100D. As explained above, this can be done directly like in FIG. 10A ('document approach') or indirectly like in FIG. 10B. If the verifier 1143 concludes that the two hash lists are indeed consistent, the further encoded image 100F (or equivalently the decoded image 100E) can be released for playback or further processing.

It is noted that the validation of the further encoded image 100F is based on a trust relationship between the further encoder 1130 and the decoder 1140, or between the persons or entities controlling these devices. If it is desired, additionally or alternatively, to validate the further encoded image 100F on the basis of a trust relationship between the first encoder 1110 and the decoder 1140, or between the persons or entities controlling these devices (e.g., author and consumer), the further encoded image 100F can be provided with an archived object that includes the fingerprints of the edited macroblocks. It is noted that because of the editing, the entirety of the further encoded image 100F cannot be validated based on this latter trust relationship, only the not-edited portions thereof.

It is understood that the hash functions 1113, 1124 and 1142 appearing in FIG. 11 are equivalent in the sense that they provide equal outputs for equal inputs.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. It is noted in particular that the above description of various embodiments has been focused on prediction-encoded video. This is because aspects of the present disclosure are expected to have particular advantages in prediction-based encoding, where the encoder and the decoder will both have access to an identical frame, in the form of the reference frame in the reference buffer of the encoder and of the decoder. Thus, in prediction-based encoding, no additional step is required for obtaining the reconstructed or decoded frame that is to be signed and verified. However, the same approach can be used for any video, not only prediction-encoded video, as long as the entity signing the video and the entity verifying the video have access to reconstructed or decoded frames of the video. It may be seen that in the case of prediction-based encoding, it is practically convenient to employ fingerprints of groups of pixels that are also used as macroblocks in encoding. In general, however, fingerprints may be computed from groups of pixels grouped in other ways. Once a frame has been decoded, it does not matter what partitioning of the pixels was made for encoding. It may, for instance be useful to divide the decoded image into smaller or larger groups of pixels than were used for encoding, depending on what types of editing is expected. For example, if masking will always be done in the form of rectangles, a coarser partitioning of the pixels may suffice for the signing process than would be used for encoding. If, on the other hand, it is envisaged that masking could be done more closely following the contours of objects to mask, a finer partitioning may be useful for the signature process.

The invention claimed is:

1. A method of editing a signed video bitstream obtained by prediction coding of a video sequence, wherein: the signed video bitstream includes data units and associated signature units, each data unit represents one macroblock in a video frame of the prediction-coded video sequence, wherein the data unit has been obtained by applying an encoder to a corresponding macroblock, each signature unit includes a digital signature of a bitstring derived from a plurality of fingerprints, and each fingerprint has been computed from a macroblock reconstructed from one data unit associated with the signature unit, the method comprising:

receiving a request to substitute a region of at least one video frame;

reconstructing a first set of macroblocks, in which said region is contained, and a second set of macroblocks referring directly or indirectly to macroblocks in the first set, wherein each reconstructed macroblock is obtained by applying a decoder to a corresponding data unit;

adding an archive object to the signed video bitstream, wherein the archive object includes fingerprints computed from the reconstructed first set of macroblocks;

editing the first set of macroblocks in accordance with the request to substitute the region of the at least one video frame, and encoding the edited first set of macroblocks as a first set of new data units;

re-encoding the second set of macroblocks as a second set of new data units; and adding the first and second sets of new data units to the signed video bitstream.

2. The method of claim 1, further comprising: adding fingerprints computed from the edited first set of macroblocks to the bitstream, wherein:

a signature unit associated with data units encoding the first set of macroblocks is replaced in the video bitstream with a substitute signature unit, which includes a digital signature of a bitstring derived from at least the computed fingerprints, or at least one new signature unit, which includes a bitstring derived from a digital signature of the computed fingerprints, is added to the video bitstream.

3. The method of claim 1, wherein the archive object further includes positions of the first set of macroblocks.

4. The method of claim 1, wherein the second set of macroblocks are re-encoded losslessly.

5. The method of claim 1, wherein:

the second set of macroblocks are re-encoded using reduced data compression; and the fingerprints of the second set of macroblocks in the signed video bitstream include robust hashes.

6. The method of claim 1, wherein the second set of macroblocks are re-encoded non-predictively.

7. The method of claim 1, wherein the second set of macroblocks are re-encoded predictively with reference to the edited first set of macroblocks.

8. The method of claim 1, wherein editing and encoding the first set of macroblocks includes:

encoding the edited first set of macroblocks losslessly and/or using reduced data compression and/or non-predictively.

9. The method of claim 1, further comprising initially providing a signature unit, which comprises:

reconstructing a plurality of macroblocks from respective data units associated with the signature unit;

computing a plurality of fingerprints from the respective reconstructed macroblocks;

deriving a bitstring from the computed fingerprints; and obtaining a digital signature of the bitstring.

10. The method of claim 9, wherein the bitstring is a combination of said plurality of fingerprints or a fingerprint of said combination.

11. The method of claim 1, wherein computing the fingerprints includes retrieving the reconstructed macroblocks from a reference decoder buffer.

12. A non-transitory computer readable recording medium comprising a computer program comprising instructions which, when the program is executed by a computer, cause the computer to carry out a method of editing a signed video bitstream obtained by prediction coding of a video sequence, wherein: the signed video bitstream includes data units and associated signature units, each data unit represents one macroblock in a video frame of the prediction-coded video sequence, wherein the data unit has been obtained by applying an encoder to a corresponding macroblock, each signature unit includes a digital signature of a bitstring derived from a plurality of fingerprints, and each fingerprint has been computed from a macroblock reconstructed from one data unit associated with the signature unit, the method comprising:

receiving a request to substitute a region of at least one video frame;

reconstructing a first set of macroblocks, in which said region is contained, and a second set of macroblocks referring directly or indirectly to macroblocks in the first set, wherein each reconstructed macroblock is obtained by applying a decoder to a corresponding data unit;

adding an archive object to the signed video bitstream, wherein the archive object includes fingerprints computed from the reconstructed first set of macroblocks and indicates positions of macroblocks represented by data units to which the included fingerprints pertain;

editing the first set of macroblocks in accordance with the request to substitute the region of the at least one video frame, and encoding the edited first set of macroblocks as a first set of new data units;

re-encoding the second set of macroblocks as a second set of new data units; and adding the first and second sets of new data units to the signed video bitstream.

* * * * *